US011349979B2

(12) United States Patent
Mun et al.

(10) Patent No.: US 11,349,979 B2
(45) Date of Patent: May 31, 2022

(54) ELECTRONIC DEVICE FOR SUPPORTING USER-CUSTOMIZED SERVICE

(71) Applicant: Samsung Electronics Co., Ltd., Gyeonggi-do (KR)

(72) Inventors: Jinho Mun, Gyeonggi-do (KR); Mihwa Park, Gyeonggi-do (KR); Donggeon Kim, Gyeonggi-do (KR); Sungdeuk Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/080,942

(22) Filed: Oct. 27, 2020

(65) Prior Publication Data

US 2021/0136193 A1    May 6, 2021

(30) Foreign Application Priority Data

Nov. 1, 2019    (KR) .......................... 10-2019-0138916

(51) Int. Cl.
*H04M 1/72448* (2021.01)

(52) U.S. Cl.
CPC .............................. *H04M 1/72448* (2021.01)

(58) Field of Classification Search
CPC ......... H04M 1/72448; H04M 1/72451; H04M 1/72454; H04M 1/72457; H04M 1/72472
See application file for complete search history.

(56) References Cited

U.S. PATENT DOCUMENTS

| 9,536,072 | B2 | 1/2017 | Guedalia et al. |
| 9,818,065 | B2 | 11/2017 | White et al. |
| 2012/0124615 | A1* | 5/2012 | Lee ...................... H04N 21/482 725/30 |
| 2013/0124332 | A1 | 5/2013 | Doughty et al. |
| 2013/0234928 | A1* | 9/2013 | Jeong ...................... G06F 9/451 345/156 |
| 2015/0067320 | A1 | 3/2015 | Chatterton et al. |

(Continued)

FOREIGN PATENT DOCUMENTS

| JP | 2007157128 A | 6/2007 | |
| WO | 2015031210 A1 | 3/2015 | |
| WO | WO-2015031210 A1 * | 3/2015 | ........... G06F 21/316 |

OTHER PUBLICATIONS

International Search Report dated Feb. 8, 2021.

*Primary Examiner* — Ankur Jain
*Assistant Examiner* — Angelica M Perez
(74) *Attorney, Agent, or Firm* — Cha & Reiter, LLC

(57) ABSTRACT

An electronic device according to an embodiment includes: a processor, and a memory configured to be operatively connected to the processor and to store a list including a plurality of profiles respectively corresponding to members recognized as users of the electronic device, wherein the memory stores, when executed, instructions that cause the processor to: acquire a usage pattern of the electronic device; compare a first profile used for configuring the electronic device among the plurality of profiles with the usage pattern; recognize a profile change based on a result of the comparison; retrieve a second profile matching the acquired usage pattern from the list based on the recognition of the profile change; and configure the electronic device using the second profile. In addition, various other embodiments are possible.

20 Claims, 14 Drawing Sheets

(56) References Cited

U.S. PATENT DOCUMENTS

2016/0037195 A1\* 2/2016 Shin ................ H04N 21/44222
  725/14
2016/0300049 A1 10/2016 Guedilla et al.

\* cited by examiner

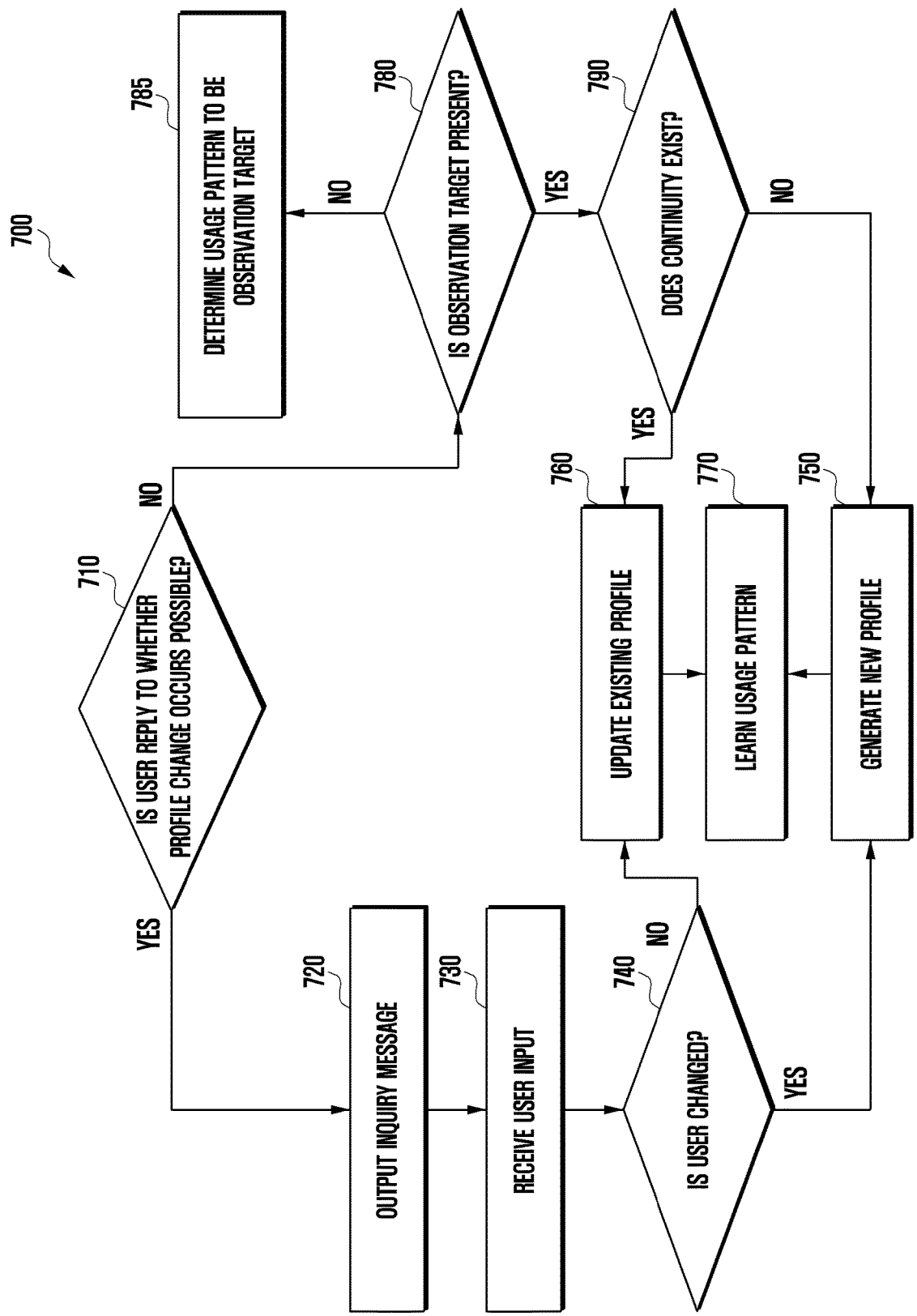

FIG. 11
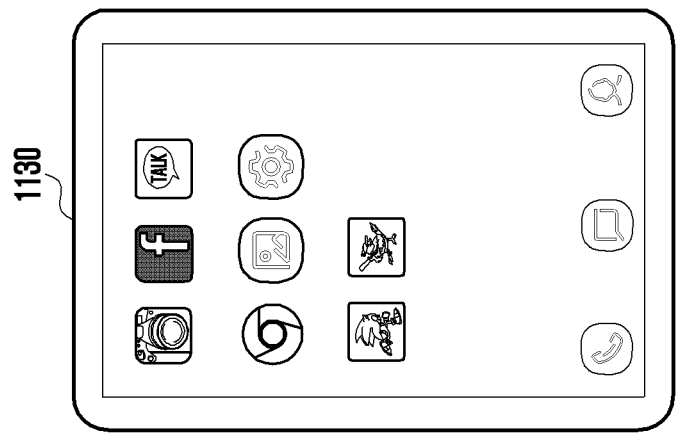
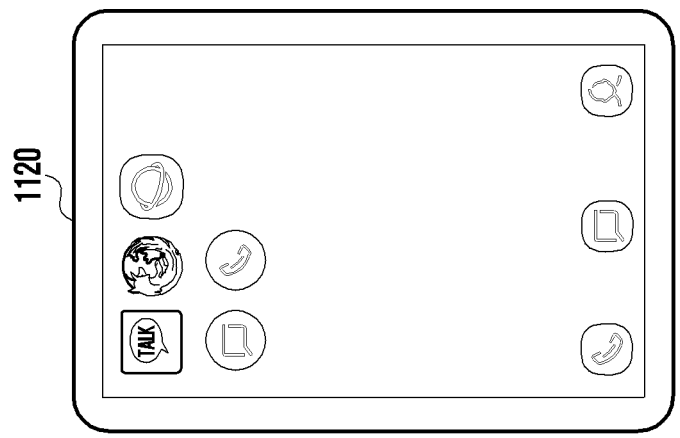
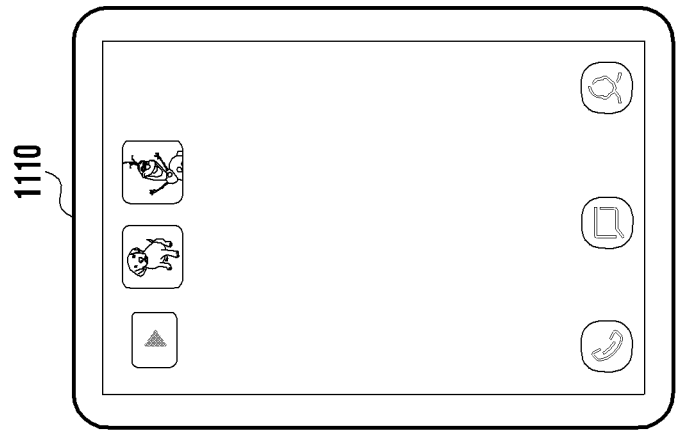

FIG. 13
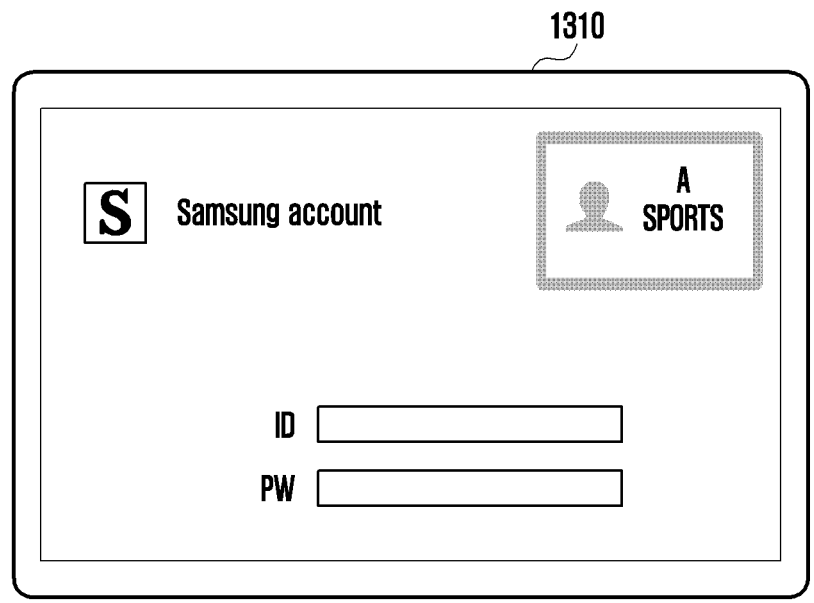
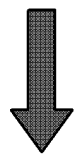
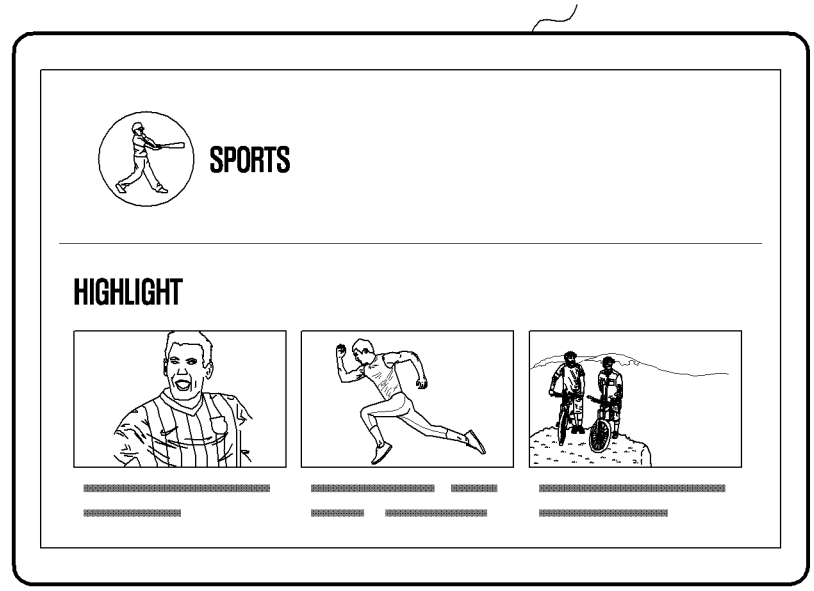

ELECTRONIC DEVICE FOR SUPPORTING USER-CUSTOMIZED SERVICE

CROSS-REFERENCE TO RELATED APPLICATION(S)

This application is based on and claims priority under 35 U.S.C. 119 to Korean Patent Application No. 10-2019-0138916, filed on Nov. 1, 2019, in the Korean Intellectual Property Office, the disclosure of which is herein incorporated by reference in its entirety.

BACKGROUND

1) Field

One or more embodiments disclosed herein generally relate to an electronic device for supporting user-customized services.

2) Description of Related Art

Electronic devices may analyze information related to the user's personal identity and/or the user's usage pattern such that the electronic devices can provide or recommend various user-customized services to the user.

The above information is presented as background information only to assist with an understanding of the disclosure. No determination has been made, and no assertion is made, as to whether any of the above might be applicable as prior art with regard to the disclosure.

SUMMARY

Several people can share an electronic device. Accordingly, it may be difficult for the electronic device to distinguish between users, and the electronic device may not be able to provide or recommend a service according to a particular user's interest or taste.

An electronic device according to an embodiment may include: a processor; and a memory configured to be operatively connected to the processor and to store a list including a plurality of profiles respectively corresponding to members recognized as users of the electronic device, wherein the memory may store, when executed, instructions that cause the processor to: acquire a usage pattern of the electronic device; compare a first profile used for configuring the electronic device among the plurality of profiles with the usage pattern; recognize a profile change based on a result of the comparison; retrieve a second profile matching the acquired usage pattern from the list based on the recognition of the profile change; and configure the electronic device using the second profile.

A method of operating an electronic device according to an embodiment may include: acquiring a usage pattern of the electronic device; comparing a first profile used for configuring the electronic device among a plurality of profiles corresponding to respective members recognized as users of the electronic device with the usage pattern; recognizing a profile change based on a result of the comparing; retrieving a second profile matching the acquired usage pattern from a list based on the recognition of the profile change; and configuring the electronic device using the second profile.

Additional aspects will be set forth in part in the description which follows and, in part, will be apparent from the description, or may be learned by practice of the presented embodiments.

BRIEF DESCRIPTION OF THE DRAWINGS

For a more complete understanding of the disclosure and its advantages, reference is now made to the following description taken in conjunction with the accompanying drawings, in which like reference numerals represent like parts, and wherein:

FIG. 7 is a flowchart illustrating operations for profile learning according to an embodiment;

FIG. 11 illustrates an example of an operation of configuring a home screen;

FIG. 13 illustrates an example of an operation of configuring a content provision screen based on user input.

DETAILED DESCRIPTION

As disclosed herein, in one or more embodiments, the electronic device can clearly identify who is using the electronic device and provide or recommend a customized service associated with the identified user's interest or taste.

According to one or more embodiments, the electronic device may identify the number of member users, relationships between the members, and profiles that match each member. Accordingly, the electronic device may provide a user-customized service to a particular user of the electronic device. For example, the electronic device may automatically identify the user based on a pattern obtained when using the electronic device and may provide a service customized for the identified user even if there is no user input for informing who the user is. Therefore, various users can share a common electronic device. The electronic device may provide a variety of user-customized content for each member through a screen (e.g., home screen, content provision screen, or initial web browser screen). As a result, information irrelevant to the user's interest may be prevented from being provided or recommended to him or her.

Figure 1:
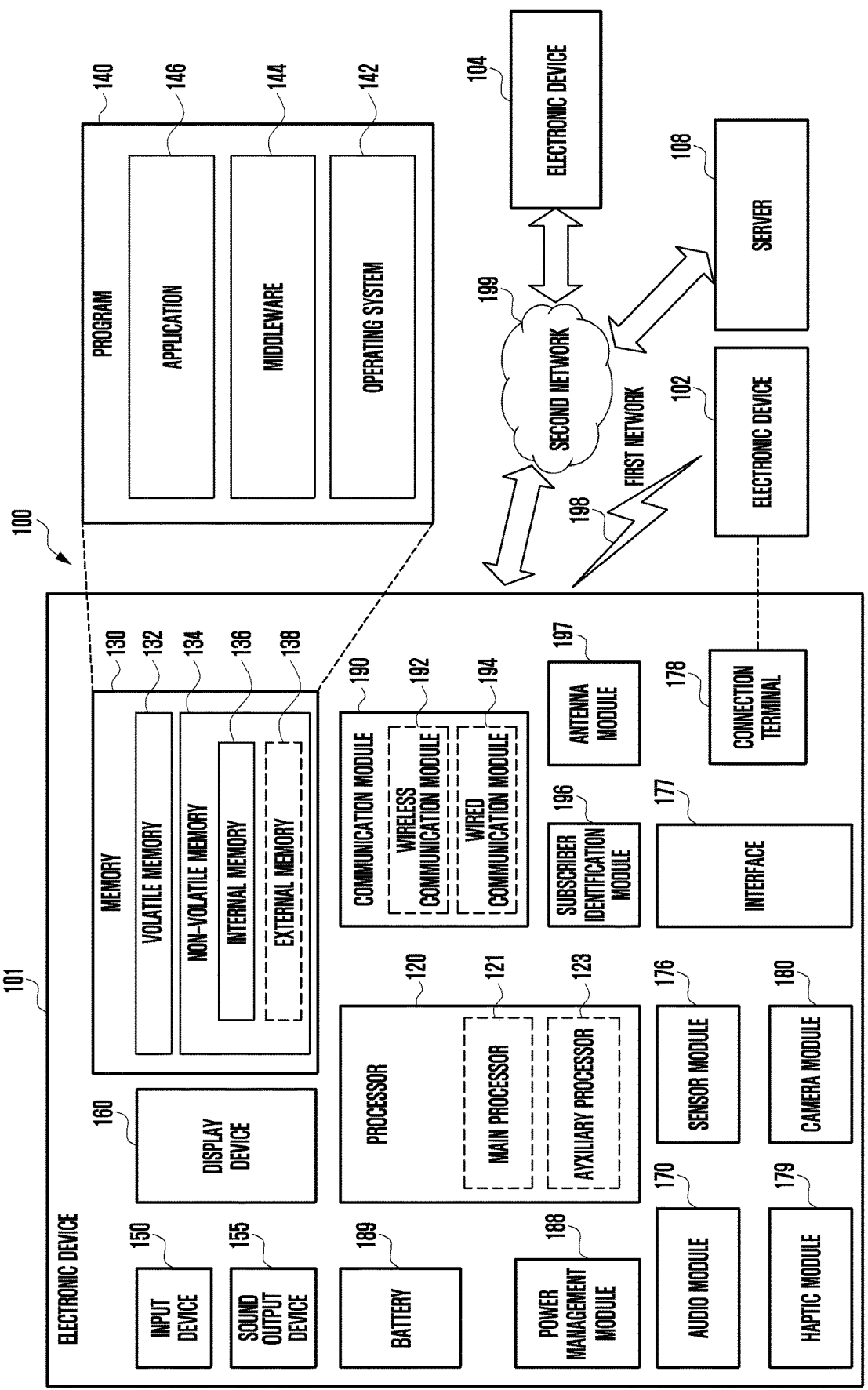
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
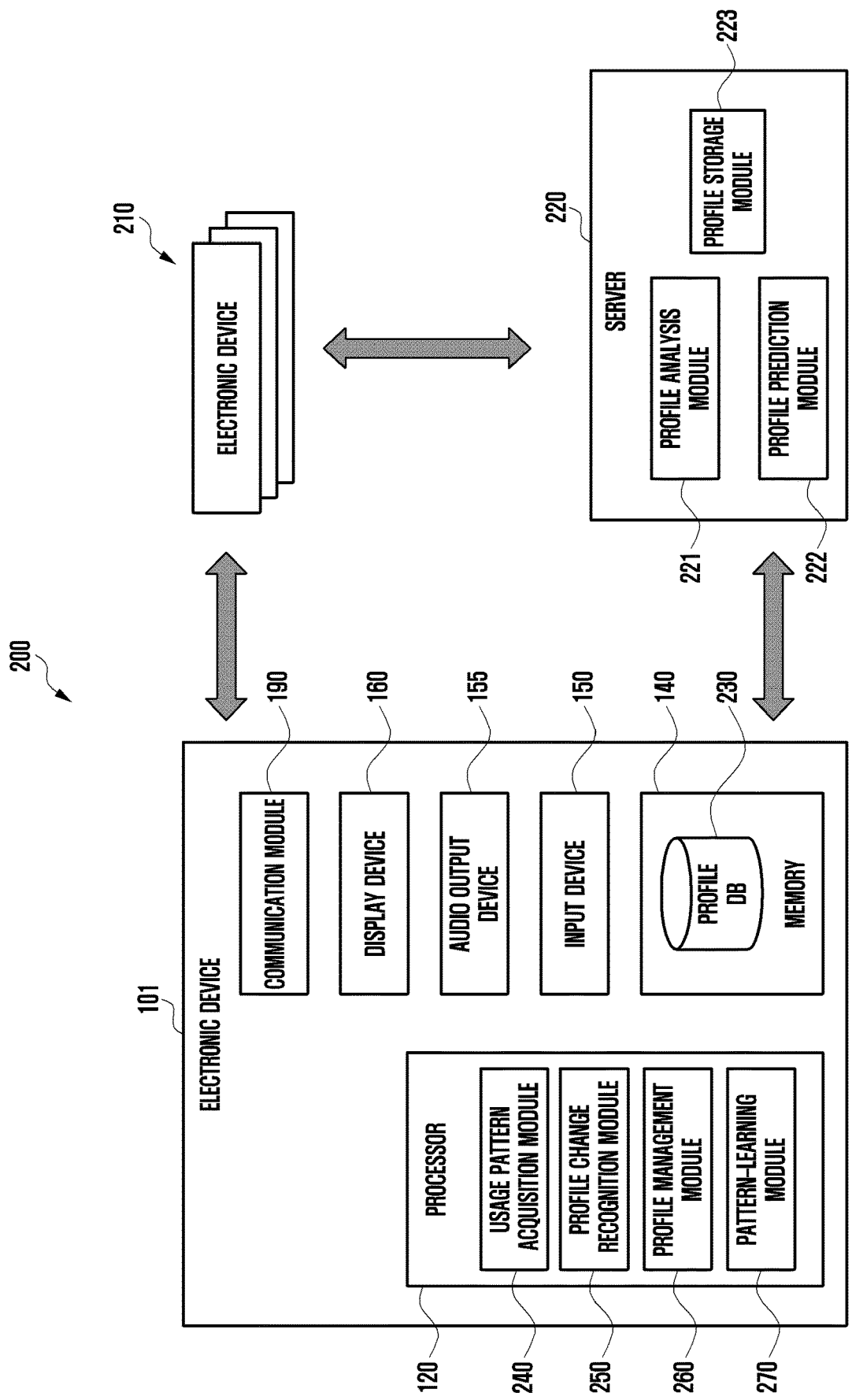
FIG. 2 illustrates a network environment configured to support a user-customized service according to an embodiment.

FIG. 2 illustrates a network environment 200 configured to support a user-customized service according to an embodiment. For convenience of description, elements that are also illustrated in FIG. 1 are omitted or briefly described. Referring to FIG. 2, in the network environment 200, an electronic device (e.g., the electronic device 101 of FIG. 1) may communicate with electronic devices 210 (e.g., the electronic device 102 or 104 of FIG. 1) or a server 220 (e.g., the server 108 of FIG. 1) through a first network 198 (e.g., a short-range wireless communication network) or a second network 199 (e.g., cellular, wired LAN, or wireless LAN). For example, wireless communication may be performed between the electronic devices 101 and 210 using peer-to-peer (P2P) communication technology (e.g., Wi-Fi Direct, Bluetooth). Communication between the server 220 and the electronic devices 210 may be performed through the first network 198 or the second network 199. The electronic device 101 may include a processor 120, a memory 130 including a profile database (DB) 230, an input device 150, an audio output device 155, a display device 160, and a communication module 190. The processor 120 may include a usage pattern acquisition module 240, a profile change recognition module 250, a profile management module 260, or a pattern-learning module 270. At least one of the modules 240, 250, 260, and 270 may be configured in the electronic device 101 as separate hardware different from the processor 120. The at least one of the modules 240, 250, 260, and 270 may be software stored in the memory 130, and the processor 120 may execute the software. At least one device among the electronic devices 210 may include one or more components that are also in the electronic device 101. The server 220 may include a profile analysis module 221, a profile prediction module 222, or a profile storage module 223. The electronic device 101 may include one or more components that are also in at least one of the modules 221, 222, and 223. For example, the processor 120 may include a module performing the same function as the function performed by the at least one of the modules 221, 222, and 223. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

At least one of the electronic devices 101 and 210 in the network environment 200 may be a public device shared by members of a community (e.g., a family). Hereinafter, for convenience of description, certain embodiments will be described on the assumption that the electronic device 101 is a public device.

The electronic device 101 may recognize who among the members is using the electronic device 101 from the personal information of the members and the usage pattern of the electronic device 101, and may provide and/or recommend a customized service to the member recognized as the user of the electronic device 101.

In one embodiment, an account used when a user logs in to the electronic device 101 may be associated with a plurality of profiles. That is, members can log in to the electronic device 101 with one account and share the electronic device 101 without having to switch accounts. For example, the electronic device 101 may configure a designated one of the plurality of profiles as a basic profile (e.g., the profile of the member authenticated as the owner of the account through a user authentication procedure) that would be matched to the member by default, and may configure the remaining profiles other than the designated profile as profiles that are incidentally matched to the member using a particular criterion.

In one embodiment, when users log in to the electronic device 101 or a service (e.g., voice secretary service) supported by the electronic device 101 with specifying an account, the electronic device 101 may recognize a first member having the basic profile as the user of the electronic device 101. The electronic device 101 may compare the usage pattern with the basic profile to determine whether the user of the electronic device 101 is changed. When it is determined that the user is changed, the electronic device 101 may identify a profile matching the usage pattern by comparing the incidental profile(s) with the usage pattern, and may recognize a second member having the identified profile as the user of the electronic device 101.

The profile analysis module 221 may collect device usage history from the electronic devices 101 and 210. In one embodiment, the electronic devices 101 and 210 may include pre-recorded personal information (or demographic information) of the members (e.g., name, age, address, information indicating the relationship between the members such as family relationships, or account information) and/or usage log in the device usage history, and may transmit the device usage history to the server 220 through the communication module 190. The usage log may include, for example, raw data related to the usage pattern of the corresponding electronic device. The profile analysis module 221 may generate profiles classified for each user (or account) by analyzing the usage log with reference to personal information, and may transmit the generated profiles to the profile storage module 223. In addition, the profile analysis module 221 may allow the electronic devices 101 and 210 to update the profile DB 230 by transmitting the generated profiles to the electronic devices 101 and 210.

The profile analysis module 221 may extract a common usage pattern for each category (or theme) (e.g., age, gender, marital status, place of use, usage time, and the like) from a profile list stored in the profile storage module 223, may generate a reference profile (or a general profile) using the extracted usage patterns, and may transmit the reference profile to the profile prediction module 222. For example, the profile analysis module 221 may extract the usage pattern for each category, such as "age," "gender," "usage time," and "frequently used application information" from the profile list and may generate a first reference profile (usage patterns for "evenings for men in their 30s" that includes, for example, a list of frequently used applications and site addresses (URLs) that users frequently visit), a second reference profile (usage patterns for "daytime for women in their 30s"), a third reference profile (usage patterns for "evenings for teenage girls"), and a fourth reference profile (usage patterns for "evenings for teenage boys").

The profile prediction module 222 may store and manage reference profiles received from the profile analysis module 221.

The profile prediction module 222 may determine one or more profiles by referencing a device usage history (e.g., personal information and usage log) to the reference profile list. In one embodiment, the profile prediction module 222 may compare the similarity between the device usage history and the reference profile list (e.g., the first to fourth reference profiles) to determine how many reference profiles the device usage history is composed of. For example, the profile prediction module 222 may recognize information related to the number of members, relationships between the members (e.g., dad, mom, son, and daughter), and an account shared by the members through comparative analysis between the device usage history and the reference profile list in order to acquire or determine each member's profile. The profile prediction module 222 may store the acquired profile in the profile storage module 223. Also, the profile prediction module 222 may cause the electronic devices 101 and 210 to update their respective profile DBs 230 by transmitting the acquired profiles to the electronic devices 101 and 210.

The profile storage module 223 may store and manage profiles received from the profile analysis module 221 and/or the profile prediction module 222 for each user (or account). In an embodiment, each member's profile may include profile elements such as age, gender, job, home address, relationship with other members, an account (e.g., an email address) to be used to log in to the electronic device (e.g., the electronic device 101), time of use, place of use, interests, bookmark information, frequently used service, application list, or visited bookmarked site addresses (e.g., uniform resource locators (URLs)).

The usage pattern acquisition module 240 may acquire the usage pattern of the electronic device 101. For example, the usage pattern acquisition module 240 may acquire at least one of the items in Table 1 below as the usage pattern.

TABLE 1

| Items | Usage patterns |
|---|---|
| 1 | Account used when user logs in to electronic device 101 or website |
| 2 | Information indicating type of program being used (e.g., calendar, camera, game, web browser, phone call, message, health) |
| 3 | function and/or service used through the program |
| 4 | Contents used and/or generated through program (e.g., image, document, website information) |
| 5 | Category of words searched through the web browser (e.g. "infant," "food," "exercise") |
| 6 | Type of application installed in electronic device 101 |
| 7 | Place and/or time in which electronic device 101 was used |
| 8 | Movement path of electronic device 101 collected through communication module 190 (e.g., GNSS) |
| 9 | Biometric information used when screen is locked (e.g. fingerprint and/or iris information) |
| 10 | Information regarding an external electronic device (e.g., at least one of electronic devices 210) that is communicating with electronic device 101 through communication module 190 (e.g., account configured in the external electronic device) |

In one embodiment, the usage pattern acquisition module 240 may periodically perform the operation of acquiring the usage pattern. In one embodiment, the usage pattern acquisition module 240 may start the acquisition operation when the screen of the display device 160 is turned on, and may terminate the acquisition operation when the screen is turned off.

The usage pattern acquisition module 240 may transmit the usage log including the acquired usage pattern to the server 220 through the communication module 190.

The profile change recognition module 250 may recognize a change in the profile based on the usage pattern acquired by the usage pattern acquisition module 240. According to an embodiment, the profile change recognition module 250 may determine the basic profile of an account used to log in to the electronic device 101 as the default used for configuring the electronic device 101 (e.g., home screen configuration). The profile change recognition module 250 may compare a first profile (e.g., basic profile) used when configuring the electronic device 101, with the usage pattern, and may recognize a change in the profile based on the comparison result. For example, when at least one of the items in the components of the first profile is different (e.g., when the currently used service is different from "frequently used service" recorded in the first profile), the profile change recognition module 250 may recognize that the profile has changed. According to an embodiment, the profile change recognition module 250 may calculate a value representing the similarity between the configured profile and the acquired usage pattern using a similarity measurement method (e.g., Euclidean distance formula), and may recognize that the profile has changed based on the fact that the similarity value is smaller than a designated threshold.

The profile management module 260 may identify, based on the determination by the profile change recognition module 250 that the profile has changed, a second profile that matches the usage pattern acquired by the usage pattern acquisition module 240 in the profile DB 230.

The profile management module 260 may configure the electronic device 101 using the second profile identified in the profile DB 230. For example, the profile management module 260 may change the configuration of a screen (e.g., home screen, content provision screen, or initial web browser screen) from a first configuration corresponding to the first profile to a second configuration corresponding to the second profile.

The pattern-learning module 270 may newly generate the second profile or update the existing first profile by learning the usage pattern based on the determination that the second profile matching the usage pattern does not exist in the profile DB 230.

In one embodiment, the pattern-learning module 270 may output an inquiry message for obtaining a user's decision as to whether a user is changed using the audio output device 155 and/or the display device 160. For example, the profile management module 260 may output a message inquiring whether the user of the electronic device 101 corresponds to the first profile. The profile management module 260 may receive a reply (user input) to the inquiry message from the input device 150 (e.g., microphone or the touch circuit of the display device 160). The pattern-learning module 270 may newly generate the second profile by learning the usage pattern when the user input indicates a user change. The pattern-learning module 270 may update the first profile using the usage pattern when the user input does not pertain to switching users. For example, the profile management module 260 may add the acquired usage pattern to the first profile as additional components of the first profile.

In one embodiment, the pattern-learning module 270 may determine whether the usage pattern has been previously recognized. When the usage pattern is a new one that has not been previously recognized, the pattern-learning module 270 may designate the usage pattern as a target to be monitored for a predetermined amount of time going forward. For example, the pattern-learning module 270 may designate the usage pattern as an observation target when the usage pattern is a new one that does not match any of the profiles included in the profile DB 230. When the usage pattern is previously recognized as a new usage pattern and designated as an observation target, the pattern-learning module 270 may determine whether a relationship (or continuity) between the usage pattern and the first profile is established. When the relationship is established (e.g., when the application used in the usage pattern is the same type of application used in the first profile such as, game), the pattern-learning module 270 may use the usage pattern (observation target) to update the first profile. When there is no relationship therebetween, the second profile may be newly generated by learning the usage pattern (observation target).

The pattern-learning module 270 may store the generated second profile or the updated first profile in the profile DB 230.

The pattern-learning module 270 may transmit the generated second profile or the updated first profile to the external electronic devices 210 through the server 220 or in a direct manner to allow the external electronic devices 210 to update their own profile DBs.

Figure 3:
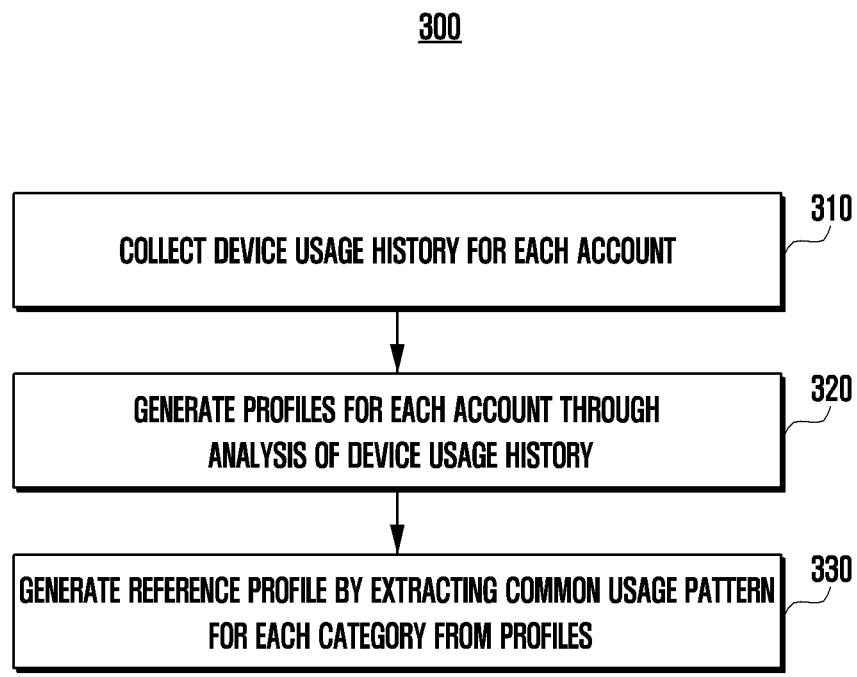
FIG. 3 is a flowchart illustrating operations for generating a reference profile according to an embodiment.

FIG. 3 is a flowchart illustrating operations 300 for generating a reference profile according to an embodiment. Referring to FIG. 3, a processor (e.g., the processor 120 of the electronic device 101 or the processor of the server 220) may perform operations 310-330 using the profile analysis module 221.

In operation 310, the processor may collect a device usage history including personal information and/or usage log for each account from the electronic devices 101 and 210.

In operation 320, the processor may generate a plurality of profiles classified for each account by analyzing the device usage history using a pre-built learning model.

In operation 330, the processor may extract a common usage pattern for each category from the profiles that have been analyzed and may generate a reference profile (e.g., the first to fourth reference profiles described above) using the common usage pattern. The processor may recognize the number of members using the electronic devices 101 and 210 in the network environment 200 and the relationships between the members through the number of reference profiles and their components (e.g., age, gender, etc.).

Figure 4:
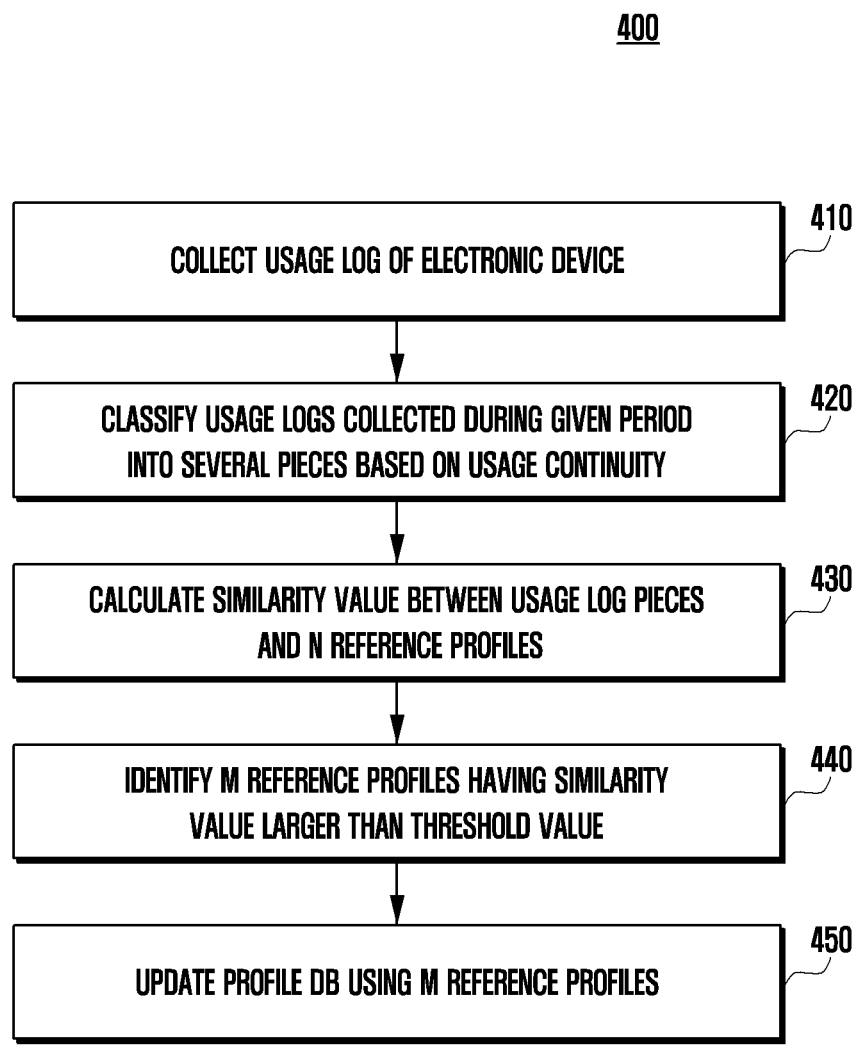
FIG. 4 is a flowchart illustrating operations for predicting a plurality of profiles according to an embodiment.

FIG. 4 is a flowchart illustrating operations 400 for predicting a plurality of profiles according to an embodiment. Referring to FIG. 4, a processor (e.g., the processor 120 of the electronic device 101 or the processor of the server 220) may perform operations 410-450 using the profile prediction module 222.

In operation 410, the processor may collect usage logs of the electronic device. For example, when the entity that performs operation 410 is the processor of the server 220, the processor may receive the usage log from another electronic device (e.g., the electronic device 101). When the entity that performs operation 410 is the processor 120 of the electronic device 101, the processor 120 may collect the usage log of the electronic device 101 using the usage pattern acquisition module 240.

In operation 420, the processor may cluster the usage logs collected during a given period into several pieces based on usage continuity (e.g., a time period during which an electronic device screen is turned on, a time period during which the user stays in one place without changing location, or a time period during which a specific app is executed).

In operation 430, the processor may calculate a value indicating the similarity between the classified usage log pieces and N reference profiles prepared in advance (e.g., the first to fourth reference profiles). In addition, the processor may exclude, from the comparison with the reference profiles, data in the usage log pieces in which the usage continuity does not satisfy a designated condition (e.g., data in which the time during which the screen has been turned on is lower than a designated threshold value).

In operation 440, the processor may identify M (≤N) reference profiles having a similarity value greater than a specified threshold value.

In operation 450, the processor may update the profile DB using the identified M reference profiles. For example, when the entity that performs operation 450 is the processor of the server 220, the processor may transmit the M reference profiles to the electronic devices 101 and 210 to allow the electronic devices 101 and 210 to update their own profile DBs. When the entity that performs operation 450 is the processor 120 of the electronic device 101, the processor 120 may update the profile DB 230 using the M reference profiles. In addition, the processor 120 may transmit the M reference profiles to other electronic devices 210 to allow the electronic devices 210 to update their own profile DBs.

Figure 5:
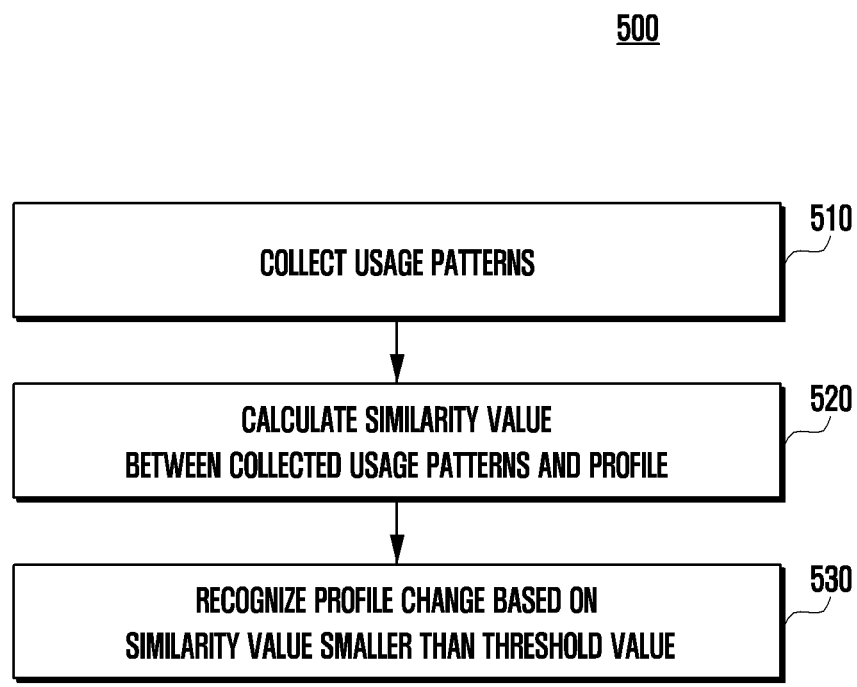
FIG. 5 is a flowchart illustrating operations for recognizing a profile change according to an embodiment.

FIG. 5 is a flowchart illustrating operations 500 for recognizing a profile change according to an embodiment. Referring to FIG. 5, the processor 120 may perform operations 510-530 using the profile change recognition module 250 of FIG. 2.

In operation 510, the processor 120 may periodically collect usage patterns of the electronic device through the usage pattern acquisition module 240 during designated periods (e.g., periods during which the screen is turned on). For example, the processor 120 may periodically collect at least one of the items illustrated in Table 1 as the usage pattern.

In operation 520, the processor 120 may calculate a value indicating the similarity between a profile (e.g., the first profile) used for configuring the electronic device 101 and the collected usage patterns. For example, the processor 120 may calculate a similarity value using the Euclidean distance formula, in which the distance between the collection of the usage patterns and a specific component (e.g., an application type and usage environment such as time or place of the use) of the profile is inversely proportional to the similarity therebetween. That is, a smaller distance indicates a greater similarity.

In operation 530, the processor 120 may recognize that the profile has changed based on observing that the similarity value is smaller than a designated threshold value.

Figure 6:
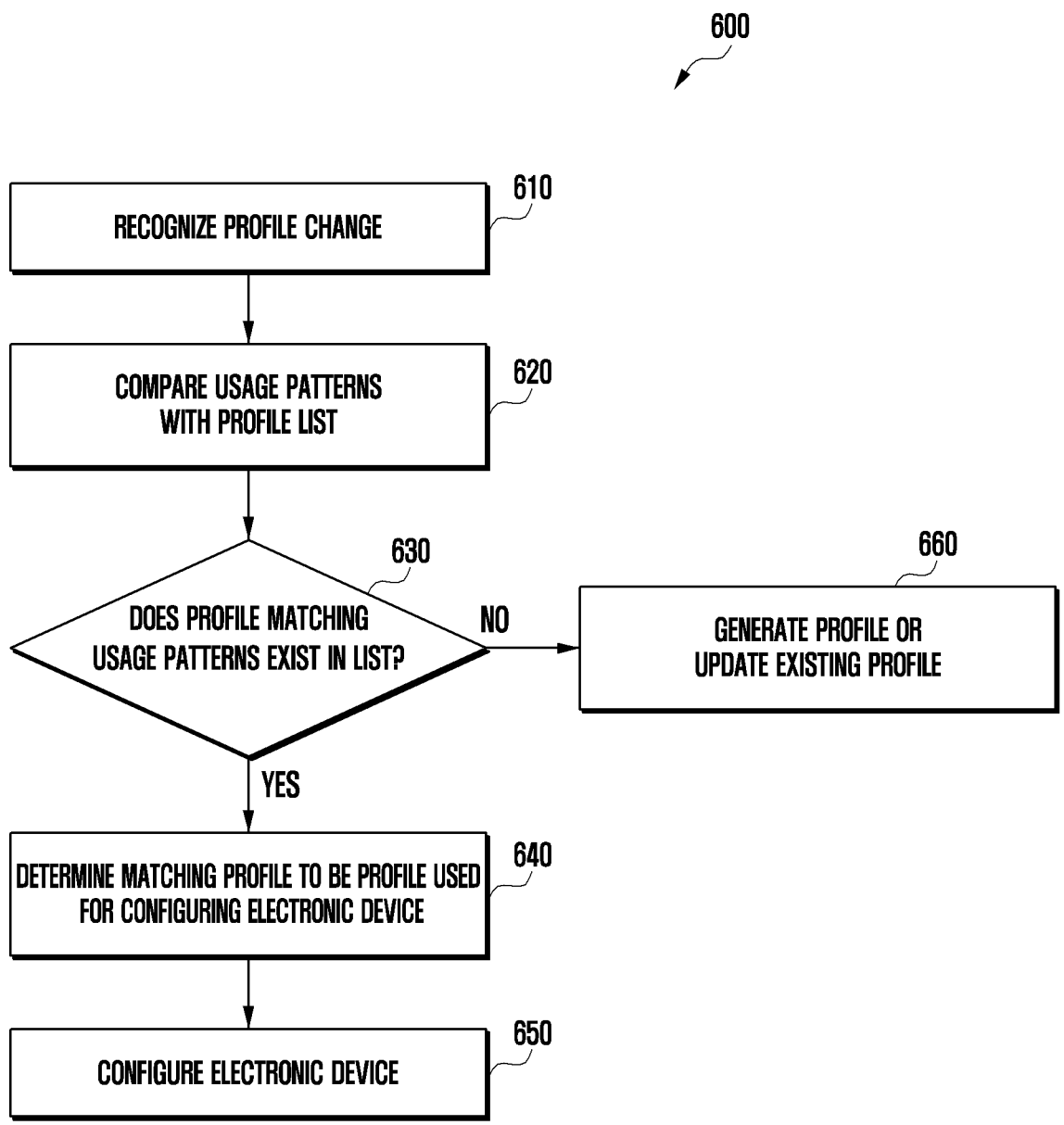
FIG. 6 is a flowchart illustrating operations for changing the configuration of an electronic device according to an embodiment.

FIG. 6 is a flowchart illustrating operations 600 for changing the configuration of the electronic device 101 according to an embodiment. Referring to FIG. 6, the processor 120 may perform operations 610-660 using the profile management module 260 of FIG. 2.

In operation 610, the processor 120 may recognize a profile change through the profile change recognition module 250.

In operation 620, the processor 120 may compare usage patterns collected through the usage pattern acquisition module 240 with a profile list stored in the profile DB 230 after the recognition of the profile change. According to an embodiment, the processor 120 may stop the configuration of the electronic device 101 using the existing first profile and may select N profiles from the list according to a designated criterion. For example, the processor 120 may identify a corresponding member from the first profile, and may select profiles in which a designated relationship (e.g., family) with the identified member is established as a candidate group.

In operation 630, the processor 120 may determine whether there is a second profile matching the collected usage patterns in the list (e.g., all profiles existing in the list or a selected candidate group).

When a matching second profile is retrieved from the list (YES in operation 630), in operation 640, the processor 120 may determine the second profile as the profile to be used for configuring the electronic device 101.

In operation 650, the processor 120 may configure the electronic device 101 using the second profile.

When the matched second profile is not retrieved from the list (NO in operation 630), in operation 660, the processor 120 may newly generate the second profile or update the existing first profile using the pattern-learning module 270.

According to an embodiment, the processor 120 may record usage patterns (e.g., account information, information of connected external electronic devices, biometric authentication information, etc.) collected through the usage pattern acquisition module 240 in the profile DB 230 as a component of the corresponding profile based on the determination (e.g., after performing operation 640) of the profile (e.g., the second profile) to be used for configuring the electronic device 101, thereby enabling more accurate profile change recognition.

FIG. 7 is a flowchart illustrating operations 700 for profile learning according to an embodiment. Referring to FIG. 7, the processor 120 may perform operations 710-790 using the pattern-learning module 270 of FIG. 2.

In operation 710, the processor 120 may determine whether a user of the electronic device 101 can reply to whether a profile change occurs, based on the fact that the profile change (a change in at least one of the above items in Table 1) is recognized (e.g., operation 530) and a profile matching the collected usage patterns has not been retrieved from the profile DB 230 (e.g., NO in operation 630). According to an embodiment, the processor 120 may determine whether reply is possible based on the state of the electronic device 101 or the surrounding environment. For example, the processor 120 may recognize that the user is driving when the electronic device 101 is recognized to be moving through the communication module 190 (e.g., GNSS) and an external electronic device connected to the electronic device 101 through a wireless channel is classified as a car. Accordingly, the processor 120 may determine that it is difficult to reply in order to avoid creating a dangerous situation.

When it is determined that reply is possible (YES in operation 710), in operation 720, the processor 120 may output an inquiry message using the audio output device 155 and/or the display device 160.

In operation 730, the processor 120 may receive a user input (reply) to the inquiry message from the input device 150 (e.g., microphone or the touch circuit of the display device 160).

In operation 740, the processor 120 may determine whether the user is changed based on the user input.

When it is determined that the user is changed (YES in operation 740), in operation 750, the processor 120 may generate a new profile by learning the usage patterns collected through the usage pattern acquisition module 240. The processor 120 may store the new profile in the profile DB 230. The processor 120 may transmit the new profile to external electronic devices 210 through the server 220 or in a direct manner using the communication module 190 in order to allow the external electronic devices to update their own profile DBs.

When it is determined that the user is not changed (NO in operation 740), in operation 760, the processor 120 may update the existing profile by learning the usage patterns collected through the usage pattern acquisition module 240. The processor 120 may store the updated profile in the profile DB 230. The processor 120 may transmit the updated profile to the external electronic devices 210 through the server 220 or in a direct manner using the communication module 190 to allow the external electronic devices to update their own profile DBs.

In operation 770, the processor 120 may enable more accurate profile change recognition by continuously learning the usage patterns collected through the usage pattern acquisition module 240, even after performing operation 750 or operation 760.

When it is determined that reply is impossible (NO in operation 710), in operation 780, the processor 120 may determine whether an observation target is present among the usage patterns collected through the usage pattern acquisition module 240.

When there is no observation target among the usage patterns and all users are new (NO in operation 780), in operation 785, the processor 120 may determine the usage patterns to be the observation targets. In addition, according to the profile change recognition (e.g., operation 610), when the configuration of the electronic device 101 using the existing profile is stopped, the processor 120 may reverse the stoppage and may maintain the configuration of the electronic device 101 using the existing profile.

When the observation target is included in the usage patterns (YES in operation 780), in operation 790, the processor 120 may determine whether a relationship (or continuity) between the observation target and the existing profile is established.

The processor 120 may perform operation 750 when it is determined that a relationship between the two is not established (NO in operation 790), and may perform operation 760 when it is determined that a relationship between the two is established (YES in operation 790).

Figure 8A:
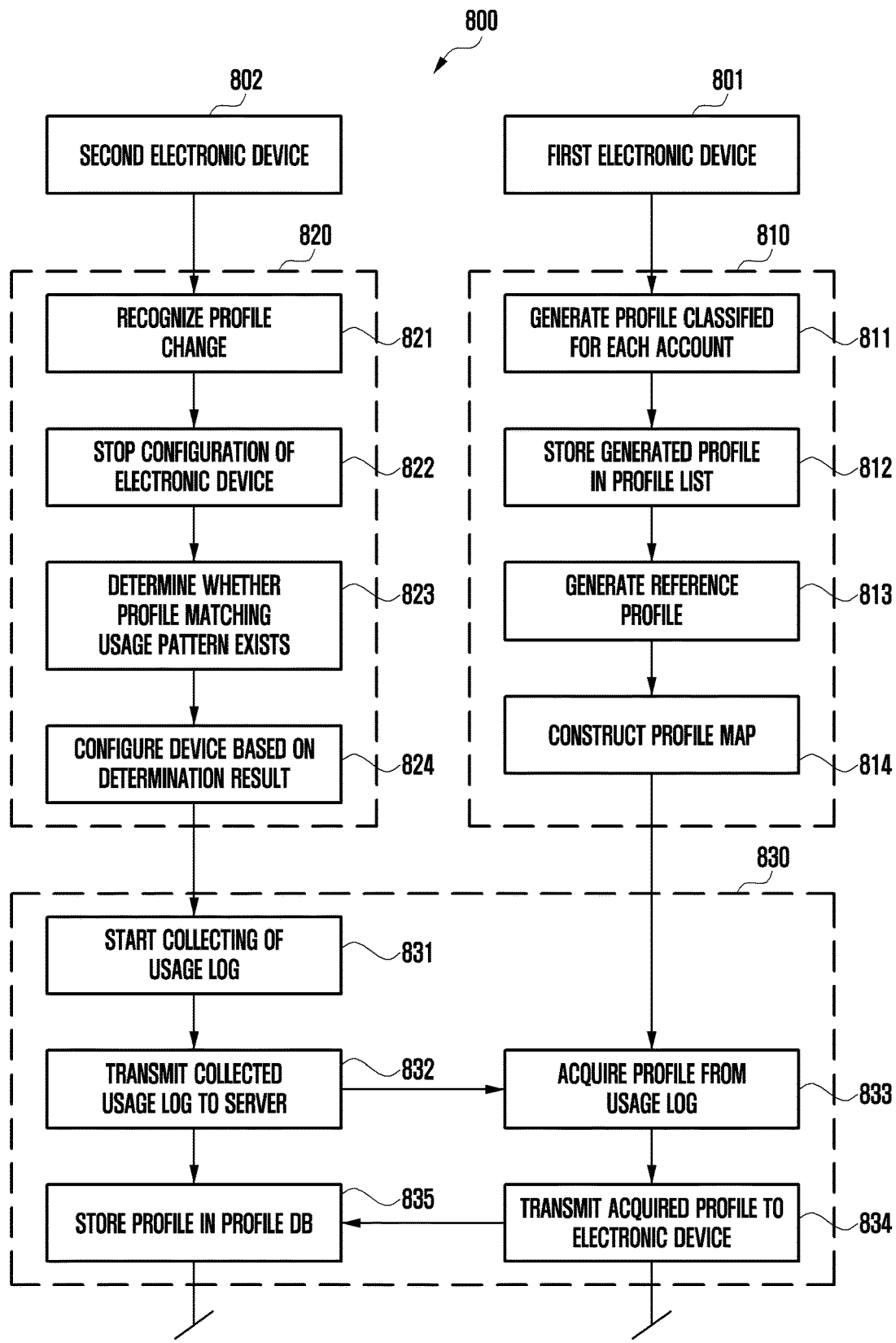
FIG. 8A is a flowchart illustrating operations for supporting a user-customized service according to an embodiment.
Figure 8B:
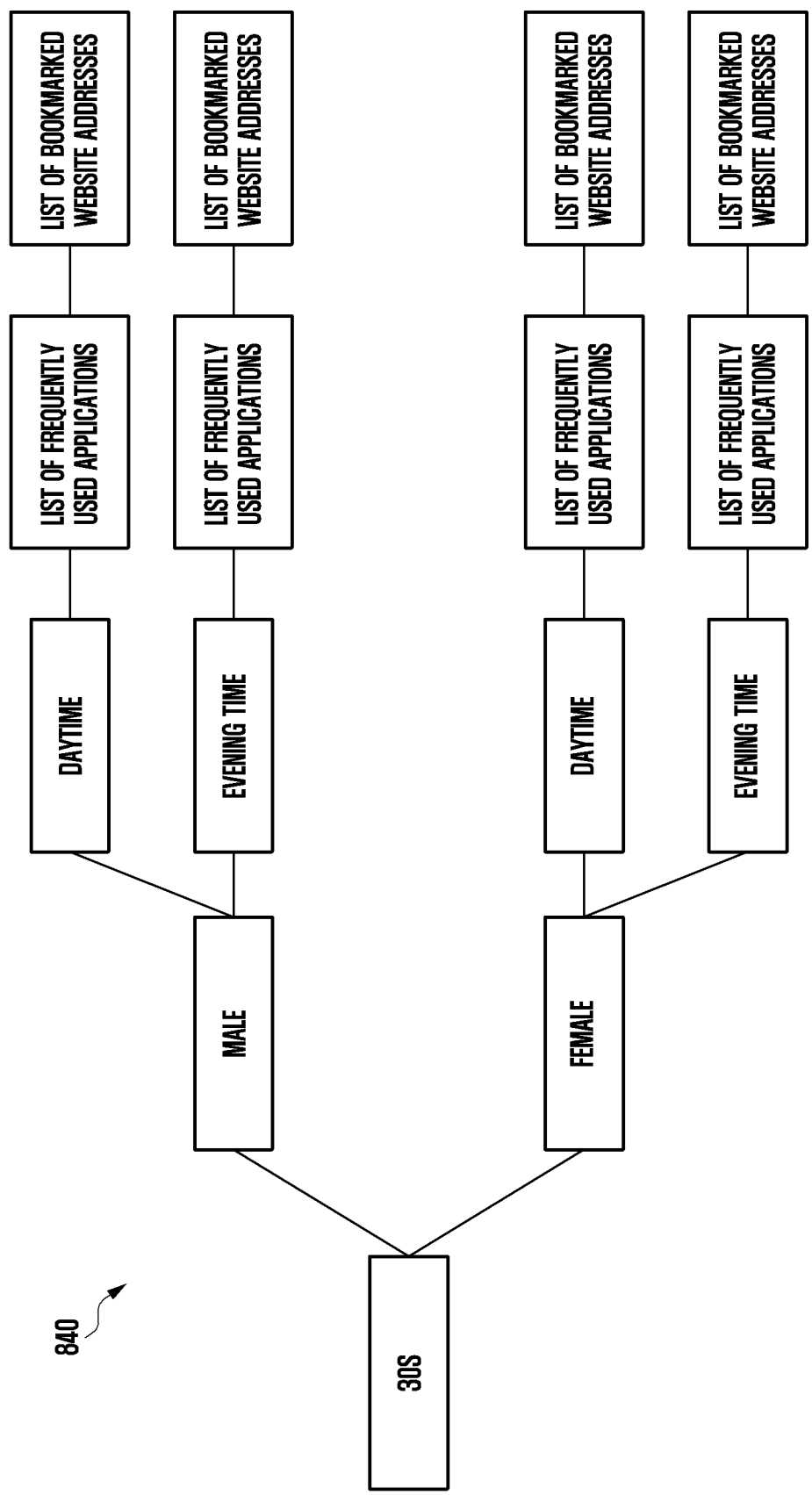
FIG. 8B is a diagram illustrating an example of a profile map constructed according to the performance of operation 810 of FIG. 8A.

FIG. 8A is a flowchart 800 illustrating operations 810, 820, and 830 for supporting a user-customized service according to an embodiment, and FIG. 8B is a diagram illustrating an example of a profile map 840 constructed according to the performance of operation 810. Referring to FIG. 8A, a first electronic device 801 (e.g., the first processor of the server 220) may perform a reference profile generation operation 810 using the modules 221, 222, and 223 of FIG. 2. A second electronic device 802 (e.g., the processor 120 of the electronic device 101) may perform a profile application operation 820 using the modules 240, 250, 260, and 270 of FIG. 2. The second electronic device 802 may perform at least a portion of a profile updating operation 830 using the modules 240, 250, 260, and 270 of FIG. 2, and the electronic device 801 may perform at least the other portions of profile updating operation 830 using the modules 221, 222, and 223 of FIG. 2.

In operation 811, the first electronic device 801 may generate profiles classified for each account by analyzing usage logs collected from other electronic devices.

In operation 812, the first electronic device 801 may store the generated profiles in a profile list.

In operation 813, the first electronic device 801 may generate reference profiles (e.g., the first to fourth reference profiles) by extracting a common usage pattern for each given category from the analyzed profiles.

In operation 814, the first electronic device 801 may construct a profile map using the reference profiles. For example, referring to FIG. 8B, the first electronic device 801 may construct the profile map 840, such as "30s—male—evening time—frequently used application list—user's bookmarked website address list", "30s—men—daytime—frequently used application list—user's bookmarked website address list", "30s—women—daytime—frequently used application list—user's bookmarked website address list", and "30s—women—evening—frequently used application list—user's bookmarked website address list", which are divided into several branches based on one profile component (e.g., "30s").

In operation 821, the second electronic device 802 may recognize a profile change. For example, the second electronic device 802 may recognize the profile change by detecting a usage pattern (e.g., at least one of the above items in Table 1) that is different from the profile used for configuring the second electronic device 802.

In operation 822, the second electronic device 802 may stop the configuration of the second electronic device 802 using the existing first profile.

In operation 823, the second electronic device 802 may determine whether a profile matching the detected usage pattern exists in the profile DB 230.

In operation 824, the second electronic device 802 may configure the second electronic device 802 based on the determination result in operation 823. For example, when a matched profile is retrieved from the profile DB 230, the second electronic device 802 may configure the second electronic device 802 with the retrieved profile. Otherwise, the second electronic device 802 may maintain the configuration of the second electronic device 802 using the existing profile.

In operation 831, the second electronic device 802 may start collecting the usage logs of the second electronic device 802. For example, the second electronic device 802 may periodically collect the usage logs during a designated period (e.g., the period during which the screen is turned on).

In operation 832, the second electronic device 802 may transmit the collected usage logs to the server 220. In addition, the second electronic device 802 may transmit personal information obtained from the user through the input device or the touch circuit of the display device to the first electronic device 801 together with the usage log. For example, the obtained personal information may be new information different from personal information previously stored in the second electronic device 802, and accordingly, the second electronic device 802 may transmit the obtained new personal information to the first electronic device 801. The second electronic device 802 may receive new personal information through the input device or the touch circuit, and may store the received new personal information in the profile DB (e.g., the profile DB 230). The second electronic device 802 may receive new personal information (e.g., account information) from an external electronic device (e.g., the electronic devices 210) and may store the received information in the profile DB (e.g., the profile DB 230).

In operation 833 (e.g., operations 420, 430, and 440 of FIG. 4), the first electronic device 801 may acquire a profile from the previously constructed profile map, the personal information, and the usage log collected from the second electronic device 802.

In operation 834, the first electronic device 801 may transmit the acquired profile to the second electronic device 802.

In operation 835, the second electronic device 802 may utilize the profile received from the first electronic device 801 in the configuration of the second electronic device 802 by storing the profile in the profile DB (e.g., the profile DB 230). The second electronic device 802 may predict the number of members who share the second electronic device 802 through the profile list stored in the profile DB. The second electronic device 802 may determine the number of members and the relationships between the members by comprehensively considering the account information, the biometric information, and the profile list. When a profile change is recognized, the second electronic device 802 may select a candidate group from the profile list based on the determined information (number of members or relationships), and may retrieve the profile to be used for configuring the second electronic device 802 from the candidate group.

Figure 9:
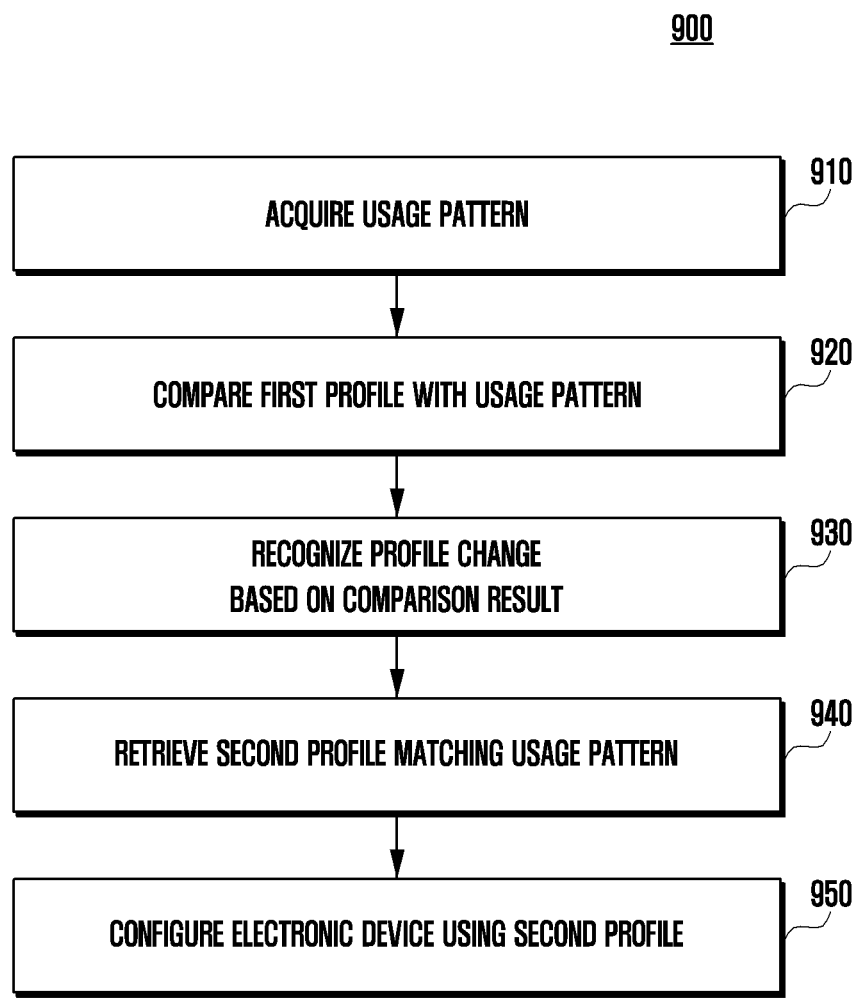
FIG. 9 is a flowchart illustrating operations for configuring an electronic device according to an embodiment.

FIG. 9 is a flowchart illustrating operations 900 for configuring the electronic device 101 according to an embodiment. Referring to FIG. 9, the processor 120 may perform operations 910-950 using the modules 240, 250, 260 of FIG. 2.

In operation 910, the processor 120 may start an operation of acquiring a usage pattern of the electronic device 101. For example, the processor 120 may start the acquisition operation when the screen of the display device 160 is turned on.

In operation 920, the processor 120 may compare a first profile (e.g., basic profile) used for configuring the electronic device 101 among a plurality of profiles (e.g., profiles stored in the memory 130) with the usage pattern obtained through the acquisition operation.

In operation 930, the processor 120 may recognize a profile change based on the comparison result. For example, when at least one of the items in Table 1 is different from the first profile component, the processor 120 may recognize that the profile has changed.

In operation 940, the processor 120 may retrieve a second profile that matches the acquired usage pattern from a profile list based on the recognition of the profile change.

In operation 950, the processor 120 may configure the electronic device using the second profile. For example, the processor 120 may change the configuration of a screen (e.g., home screen, content provision screen, or initial web browser screen) from a first configuration corresponding to the first profile to a second configuration corresponding to the second profile.

Figure 10:
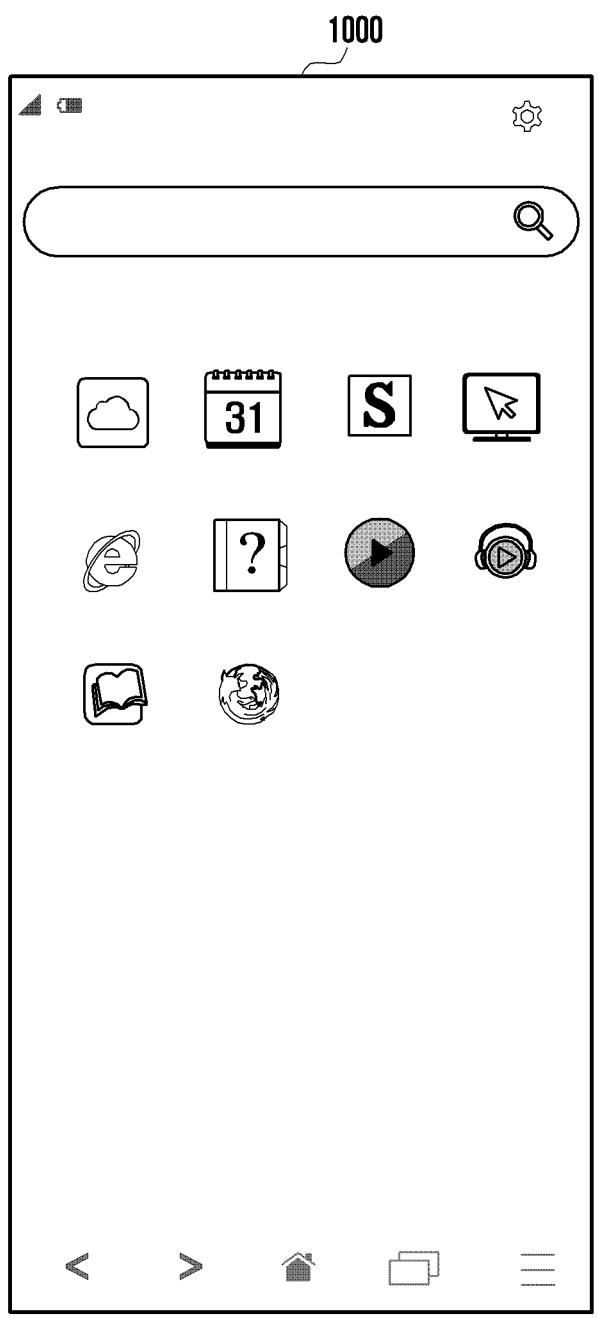
FIG. 10 illustrates an example of an operation of configuring an initial web browser screen.

FIG. 10 illustrates an example of an operation of configuring an initial web browser screen. Referring to FIG. 10, the processor 120 may configure an initial web browser screen using a profile. For example, the processor 120 may identify a website list in a profile, may configure the identified website list in the form of icons, and may display the configured website list on an initial screen 1000 of the web browser. Thereafter, the processor 120 may recognize a profile change, may retrieve a profile matching the usage pattern from the profile DB 230, and may change the configuration of the initial screen 1000 to match the retrieved profile.

FIG. 11 illustrates an example of an operation of configuring a home screen. Referring to FIG. 11, the processor 120 may identify a user of the electronic device 101 among members from personal information of the members and a usage pattern of the electronic device 101. The processor 120 may configure a home screen to match the identified user. For example, when the user of the electronic device 101 is identified as a first member, the processor 120 may identify a first application list in the profile of the first member, and may configure the first application list in the form of icons to display the configured first application list on a first home screen 1110. When the user of the electronic device 101 is identified as a second member, the processor 120 may identify a second application list in the profile of the second member, and may configure the second application list in the form of icons to display the configured second application list on a second home screen 1120. When the user of the electronic device 101 is identified as a third member, the processor 120 may identify a third application list in the profile of the third member, and may configure a third application list in the form of icons to display the configured third application list on a third home screen 1130.

When a currently used application is not retrieved from the profile of the user of the electronic device 101, the processor 120 may identify a relationship between the currently used application and the application list of the user profile. For example, when an application belonging to the same type (e.g., game) as the currently used application exists in the application list, the processor 120 may determine that a relationship between the two is established, and accordingly may add information of the currently used application to the profile of the user of the electronic device 101. In addition, the processor 120 may display an icon of the currently used application on the home screen.

Figure 12:
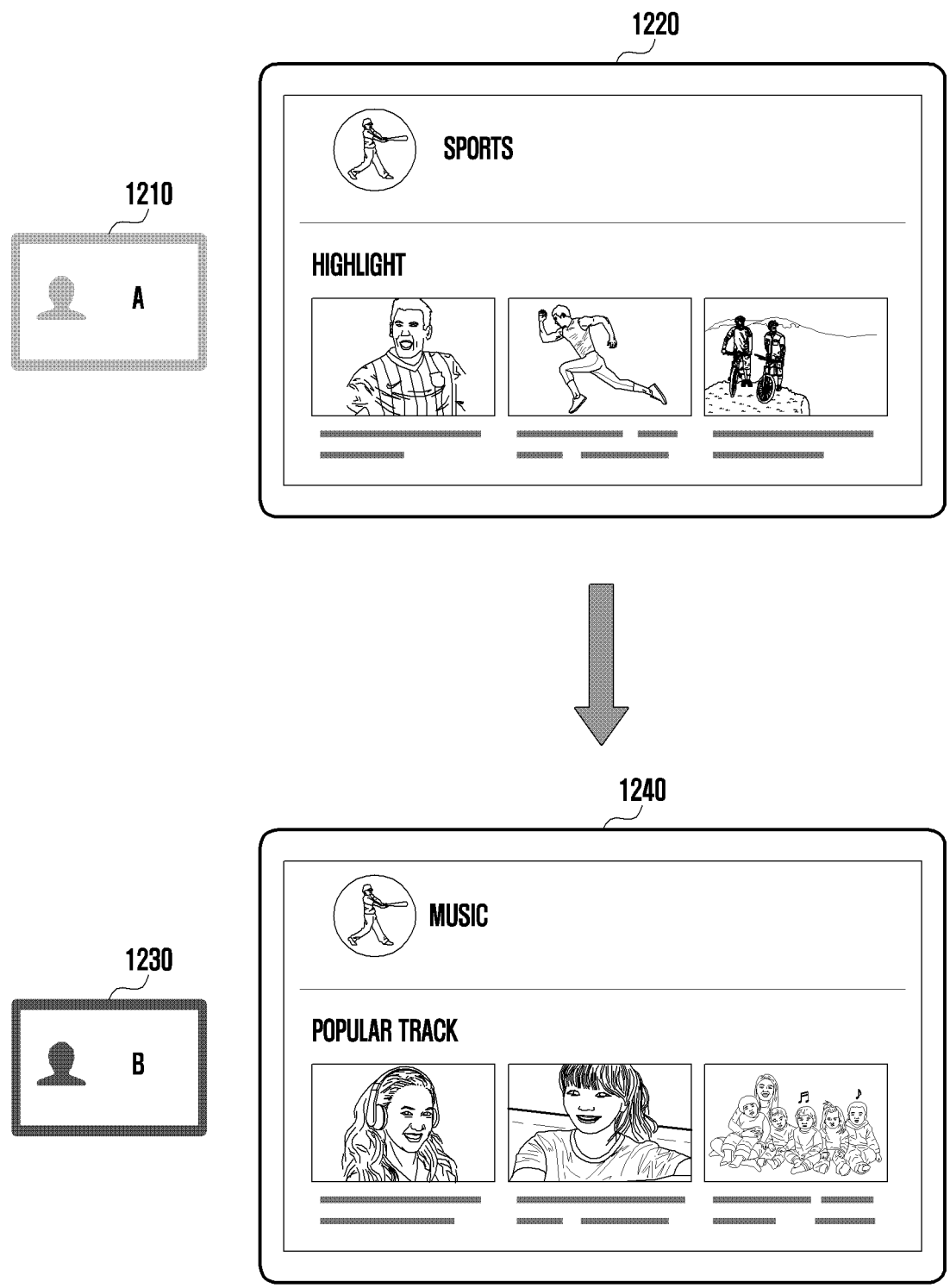
FIG. 12 illustrates an example of an operation of changing the configuration of a content provision screen.

FIG. 12 illustrates an example of an operation of changing the configuration of a content provision screen. Referring to FIG. 12, the processor 120 may recognize, from a first profile configured in the electronic device 101, that the interest of a first member 1210 as the user of the electronic device 101 is, for example, sports. Accordingly, the processor 120 may configure and display a first content provision screen 1220 as information related to sports. Thereafter, the processor 120 may recognize a profile change based on a usage pattern acquired through the usage pattern acquisition module 240, and may identify a second profile matching the acquired usage pattern in the profile DB 230. The processor 120 may recognize that the user of the electronic device 101 is a second member 1230 and that the interest of the second member 1230 is, for example, music, from the second profile. Accordingly, the processor 120 may configure and display a second content provision screen 1240 as information related to the music.

FIG. 13 illustrates an example of an operation of configuring a content provision screen based on user input. Referring to FIG. 13, the processor 120 may recognize a profile change based on usage pattern acquired through the usage pattern acquisition module 240. For example, when the electronic device 101 is configured with a first profile corresponding to a first account, the processor 120 may recognize that the acquired usage pattern (e.g., sports-related retrieval) is a pattern when a member corresponding to a second account uses the electronic device 101. Based on the above recognition, the processor 120 may identify a second profile matching the acquired usage pattern in the profile DB 230, and may determine the second profile to be the profile to be used for configuring the electronic device 101. The processor 120 may configure and display a screen 1310 requiring a login with the second account. When login is successful with the user account, the processor 120 may configure and display a content provision screen 1320 as information related to sports.

An electronic device according to an embodiment may include: a processor; and a memory configured to be operatively connected to the processor and to store a list including a plurality of profiles respectively corresponding to members recognized as users of the electronic device, wherein the memory may store, when executed, instructions that cause the processor to: acquire a usage pattern of the electronic device; compare a first profile used for configuring the electronic device among the plurality of profiles with the usage pattern; recognize a profile change based on a result of the comparison; retrieve a second profile matching the acquired usage pattern from the list based on the recognition of the profile change; and configure the electronic device using the second profile.

The instructions may cause the processor to: identify that no profile matches the acquired usage pattern; and generate a new profile or update the first profile using the usage pattern based on identifying that no profile matches the acquired usage pattern.

The electronic device may further include a touch-sensitive display, an audio output device, and an input device, wherein the instructions may cause the processor to: output a message for identifying whether the user is changed through the display and/or the audio output device based on identifying that no profile matches the acquired usage pattern; receive user input through the input device or the display in response to the message; update the first profile using the usage pattern when the user input indicates that the user of the electronic device is not changed; and generate a new profile using the usage pattern when the user input indicates that the user of the electronic device is changed.

The instructions may cause the processor to: determine whether the acquired usage pattern is an observation target previously recognized and designated as a new usage pattern, based on identifying that no profile matches the acquired usage pattern; and designate the acquired usage pattern as a new observation target when the acquired usage pattern is a new usage pattern that has not been previously recognized.

The instructions may cause the processor to: determine whether a relationship between the acquired usage pattern and the first profile is established when the acquired usage pattern is the observation target; update the first profile using the usage pattern operation when a relationship between the acquired usage pattern and the first profile is established; and generate a new profile using the usage pattern when a relationship between the acquired usage pattern and the first profile is not established.

The acquired usage pattern may include use of an application, and the instructions may cause the processor to: determine that a relationship between the acquired usage pattern and the first profile is established when the application in the acquired usage pattern is of a same type as an application included in the first profile.

The electronic device may further include a display, and the instructions may cause the processor to: change the configuration of a screen to be displayed on the display from a first configuration corresponding to the first profile to a second configuration corresponding to the second profile based on the fact that the second profile matching the acquired usage pattern is retrieved from the list.

The screen may include at least one of a home screen, a content provision screen, or an initial web browser screen.

The instructions may cause the processor to: calculate a value indicating similarity between the acquired usage pattern and the first profile; and recognize that the profile has changed based on the fact that the value is smaller than a designated threshold value.

The electronic device may further include a communication circuit, and the instructions may cause the processor to: collect a usage log of the electronic device; transmit the usage log to an external electronic device through the communication circuit; receive a profile generated based on the usage log from the external electronic device; and update the list using the received profile.

The plurality of profiles may include at least one of information related to a time of use, a place of use, an interest, bookmark information, a frequently used service, an application list, or a bookmarked website address.

The plurality of profiles may correspond to the same account used to log in to the electronic device.

The instructions may cause the processor to: start acquiring the usage pattern when a screen of the electronic device is turned on; and terminate acquisition of the usage pattern when the screen is turned off.

The instructions may cause the processor to: generate the plurality of profiles classified for one or more accounts using personal information of the members and usage logs of the electronic device collected during a given period; extract a common usage pattern for one or more categories from the plurality of profiles; generate a plurality of reference profiles using the common usage pattern; and recognize relationships between the members based on the plurality of reference profiles.

The instructions may cause the processor to: classify the usage logs into several pieces based on usage continuity; calculate a value indicating similarity between the several pieces and the plurality of reference profiles; identify a reference profile having a similarity value larger than a designated threshold value; and update the list using the identified reference profile. The usage continuity may be a time period during which a screen of the electronic device is turned on, a time period during which a user stays in one place, or a time period during which a specific application is executed.

A method of operating an electronic device according to an embodiment may include: acquiring a usage pattern of the electronic device; comparing a first profile used for configuring the electronic device among a plurality of profiles respectively corresponding to members recognized as users of the electronic device with the usage pattern; recognizing a profile change based on a result of the comparing; retrieving a second profile matching the acquired usage pattern from a list based on the recognition of the profile change; and configuring the electronic device using the second profile.

The method may further include: identifying that no profile matches the acquired usage pattern; outputting a message for identifying whether a user is changed through a touch-sensitive display of the electronic device and/or an audio output device thereof based on the identifying; receiving a user input through an input device of the electronic device or the display thereof in response to the message; updating the first profile using the usage pattern when the user input indicates that the user of the electronic device is not changed; and generating a new profile using the usage pattern when the user input indicates that the user of the electronic device is changed.

The method may further include: identifying that no profile matches the acquired usage pattern; determining whether the acquired usage pattern is an observation target previously recognized and designated as a new usage pattern based on the identifying; and designating the acquired usage pattern as a new observation target when the acquired usage pattern is a new usage pattern that has not been previously recognized.

The method may further include: determining whether a relationship between the acquired usage pattern and the first profile is established when the acquired usage pattern is the observation target; updating the first profile using the usage pattern when the relationship between the acquired usage pattern and the first profile is established; and generating a new profile using the usage pattern when the relationship between the acquired usage pattern and the first profile is not established.

The acquired usage pattern may include use of an application, and the determining whether the relationship is established may include: determining that the relationship between the acquired usage pattern and the first profile is established when the application in the acquired usage pattern is of a same type as an application included in the first profile.

The embodiments of the disclosure disclosed in the specification and drawings are merely to provide a specific example to easily explain the technical contents according to the embodiments of the disclosure and to help understand the embodiments of the disclosure, and are not intended to limit the scope of the embodiments of the disclosure. Therefore, the scope of various embodiments of the disclosure should be interpreted to include all changes or modified forms derived based on the technical spirit of the various embodiments of the disclosure in addition to the embodiments disclosed herein.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
a processor; and
a memory configured to be operatively connected to the processor and to store a list including a plurality of profiles respectively corresponding to members recognized as users of the electronic device,
wherein the memory stores, when executed, instructions that cause the processor to:
acquire a usage pattern of the electronic device;
compare a first profile used for configuring the electronic device among the plurality of profiles with the usage pattern;
recognize a profile change based on a result of the comparison;
retrieve a second profile matching the acquired usage pattern from the list based on recognition of the profile change; and
configure the electronic device using the second profile,
wherein the plurality of profiles is stored in the memory as a profile map having a first component related to age ranges of the users, a second component related to genders of the users, and a third component related to times of use by the users, and
wherein the second component is divided into branches from the first component, and the third component is divided into branches from the second component.

2. The electronic device of claim 1, wherein the instructions cause the processor to:
identify that no profile matches the acquired usage pattern; and
generate a new profile or update the first profile using the usage pattern based on identifying that no profile matches the acquired usage pattern.

3. The electronic device of claim 2, further comprising:
a touch-sensitive display, an audio output device, and an input device, and
wherein the instructions cause the processor to:
output a message for identifying whether a user is changed through the display and/or the audio output device based on identifying that no profile matches the acquired usage pattern;
receive a user input through the input device or the display in response to the message;
update the first profile using the usage pattern when the user input indicates that the user of the electronic device is not changed; and
generate a new profile using the usage pattern when the user input indicates that the user of the electronic device is changed.

4. The electronic device of claim 2, wherein the instructions cause the processor to:
determine whether the acquired usage pattern is an observation target previously recognized and designated as a new usage pattern, based on identifying that no profile matches the acquired usage pattern; and
designate the acquired usage pattern as a new observation target when the acquired usage pattern is a new usage pattern that has not been previously recognized.

5. The electronic device of claim 4, wherein the instructions cause the processor to:
determine whether a relationship between the acquired usage pattern and the first profile is established when the acquired usage pattern is the observation target;
update the first profile using the usage pattern when the relationship between the acquired usage pattern and the first profile is established; and
generate a new profile using the usage pattern when the relationship between the acquired usage pattern and the first profile is not established.

6. The electronic device of claim 5, wherein the acquired usage pattern comprises use of an application, and wherein the instructions may cause the processor to:
determine that the relationship between the acquired usage pattern and the first profile is established when the application in the acquired usage pattern is of a same type as an application included in the first profile.

7. The electronic device of claim 1, further comprising:
a display,
wherein the instructions cause the processor to:
change a configuration of a screen to be displayed on the display from a first configuration corresponding to the first profile to a second configuration corresponding to the second profile based on retrieval of the second profile matching the acquired usage pattern from the list.

8. The electronic device of claim 7, wherein the screen comprises a home screen, a content provision screen, or an initial web browser screen.

9. The electronic device of claim 1, wherein the instructions cause the processor to:
calculate a value indicating similarity between the acquired usage pattern and the first profile; and
recognize that the first profile has been changed based on the value being smaller than a designated threshold value.

10. The electronic device of claim 1, further comprising: a communication circuit,
wherein the instructions cause the processor to:
collect a usage log of the electronic device;
transmit the usage log to an external electronic device through the communication circuit;
receive a profile generated based on the usage log from the external electronic device; and
update the list using the received profile.

11. The electronic device of claim 1, wherein the plurality of profiles further comprises information related to a place of use, an interest, bookmark information, a frequently used service, an application list, or a bookmarked site address.

12. The electronic device of claim 11, wherein the plurality of profiles correspond to a same account used to log in to the electronic device.

13. The electronic device of claim 1, wherein the instructions cause the processor to:
start acquiring the usage pattern when a screen of the electronic device is turned on; and
terminate acquisition of the usage pattern when the screen is turned off.

14. The electronic device of claim 1, wherein the instructions cause the processor to:
generate the plurality of profiles classified for one or more accounts using personal information of the members and usage logs of the electronic device collected during a given period;
extract a common usage pattern for one or more categories from the plurality of profiles;
generate a plurality of reference profiles using the common usage pattern; and
recognize relationships between the members based on the plurality of reference profiles.

15. The electronic device of claim 14, wherein the instructions cause the processor to:
classify the usage logs into several pieces based on usage continuity;
calculate a value indicating similarity between the several pieces and the plurality of reference profiles;
identify a reference profile having a similarity value larger than a designated threshold value; and
update the list using the identified reference profile, and wherein
the usage continuity is a time period during which a screen of the electronic device is turned on, a time period during which a user stays in one place, or a time period during which a specific application is executed.

16. A method of operating an electronic device, the method comprising:
acquiring a usage pattern of the electronic device;
comparing a first profile used for configuring the electronic device among a plurality of profiles respectively corresponding to members recognized as users of the electronic device with the usage pattern;
recognizing a profile change based on a result of the comparing;
retrieving a second profile matching the acquired usage pattern from a list based on the recognizing the profile change; and
configuring the electronic device using the second profile,
wherein the plurality of profiles is stored as a profile map having a first component related to age ranges of the users, a second component related to genders of the users, and a third component related to times of use by the users, and
wherein the second component is divided into branches from the first component, and the third component is divided into branches from the second component.

17. The method of claim 16, further comprising:
identifying that no profile matches the acquired usage pattern;
outputting a message for identifying whether a user is changed through a touch-sensitive display of the electronic device and/or an audio output device thereof based on the identifying;
receiving a user input through an input device of the electronic device or the display thereof in response to the message;
updating the first profile using the usage pattern when the user input indicates that the user of the electronic device is not changed; and
generating a new profile using the usage pattern when the user input indicates that the user of the electronic device is changed.

18. The method of claim 16, further comprising:
identifying that no profile matches the acquired usage pattern;
determining whether the acquired usage pattern is an observation target previously recognized and designated as a new usage pattern based on the identifying; and
designating the acquired usage pattern as a new observation target when the acquired usage pattern is a new usage pattern that has not been previously recognized.

19. The method of claim 18, further comprising:
determining whether a relationship between the acquired usage pattern and the first profile is established when the acquired usage pattern is the observation target;
updating the first profile using the usage pattern when the relationship between the acquired usage pattern and the first profile is established; and
generating a new profile using the usage pattern when the relationship between the acquired usage pattern and the first profile is not established.

20. The method of claim 19, wherein the acquired usage pattern comprises use of an application, and
wherein the determining whether the relationship is established comprises determining that the relationship between the acquired usage pattern and the first profile is established when the application in the acquired usage pattern is of a same type as an application included in the first profile.

* * * * *